United States Patent [19]
Binder

[11] Patent Number: 5,841,360
[45] Date of Patent: Nov. 24, 1998

[54] DISTRIBUTED SERIAL CONTROL SYSTEM

[76] Inventor: Yehuda Binder, 30 Yeshurun St., Hod Hasharon, Israel, 45200

[21] Appl. No.: 734,921

[22] Filed: Oct. 22, 1996

[51] Int. Cl.$^6$ .................................................... G06F 15/46
[52] U.S. Cl. ............................... 340/825.07; 340/825.06; 340/310.01; 370/527; 370/529; 370/475; 370/408; 370/501; 370/502; 370/419
[58] Field of Search ......................... 340/310.01, 825.07, 340/825.06; 370/527, 529, 475, 408, 501, 502, 419

[56] References Cited

U.S. PATENT DOCUMENTS

| | | | |
|---|---|---|---|
| 5,095,417 | 3/1992 | Hagiwara et al. | 340/825.06 |
| 5,454,008 | 9/1995 | Baumann et al. | 340/693 |
| 5,475,687 | 12/1995 | Markkula, Jr. et al. | 370/419 |
| 5,535,336 | 7/1996 | Smith et al. | 340/825.07 |

FOREIGN PATENT DOCUMENTS 0468194  1/1992  European Pat. Off. .

*Primary Examiner*—Michael Horabik
*Assistant Examiner*—Yves Dalencourt
*Attorney, Agent, or Firm*—Browdy and Neimark

[57] ABSTRACT

A network topology allowing distributed sensing, control and communication, comprising a power source and a plurality of line-Powered, Serially connected Intelligent Cells (PSICs) coupled to the power source and to each other via respective communication channels comprising at least two electrical conductors. Each of the PSICs is uniquely addressed, preferably "on the fly" in real time, and at least one payload element is coupled to one of the PSICs for operating in accordance with control logic embedded in or fed to the corresponding PSIC. The communication channels allow for data transfer between adjacent PSICs in either or both directions independent of a simultaneous communication between another pair of adjacent PSICs.

24 Claims, 4 Drawing Sheets

DISTRIBUTED SERIAL CONTROL SYSTEM

FIELD OF THE INVENTION

This invention relates to the field of wired communication and control systems, in particular to such systems which provide for simultaneous distribution of power and message information along the same wires in a network having a plurality of sensors, actuators and processing elements.

BACKGROUND OF THE INVENTION

Distributed control systems are known comprising a number of intelligent "cells" to which power and data are fed and to which may be coupled external payload elements such as one or more sensors and actuators and in which the actuators operate responsive to a control signal produced by a processor which itself is responsive to the data signals as well as sensor signals produced by the sensors.

Such a network is shown, for example, in U.S. Pat. No. 4,918,690 (Markkula, Jr. et al.) assigned to Echelon Corporation in whose name are various other U.S. patents relating to this art. Each of the programmable cells is assigned during manufacture with a 48 bit unique identification number (ID) which remains permanently within the cell. The cells can be coupled to different media such as power lines, twisted pair, radio frequency etc. to form a network.

Groups of cells within a network are formed to perform particular functions and are addressed via their respective Ids. Some cells (announcers) are assigned the task of sensing, for example, the condition of a switch, and others (listeners) the task of controlling, such as controlling a light. Cells can perform multiple tasks and can be members of different groups within a network. For example, a cell can function as a repeater for one group and as a listener for another group.

FIG. 1 shows a typical network configuration 1 such as described in U.S. Pat. No. 5,454,008 (Baumann et al.) also assigned to Echelon Corporation. The cells are denoted by a plurality of nodes 2 which are interconnected by twisted pair lines 3. The lines form numerous branches each having a single node connected thereto and all of which receive power over the twisted pair lines from a central power supply 4. The power supply 4 is connected to the network 1 through a source coupler 5. Thus, in such an arrangement, each node forms an effective line termination so that more nodes can be accommodated in the network simply by connecting additional branches where required and terminating each branch with a new node.

Such a network configuration permits relatively easy extension so as to accommodate additional nodes whilst reducing the cabling overhead as compared with known star topologies. However, the bus topology shown in FIG. 1 requires complicated addressing in order to permit each cell or node to be individually addressed. Moreover, a transmitting node ties up the whole network thus preventing two or more nodes from transmitting data simultaneously.

Furthermore, the nodes or cells shown in abovementioned U.S. Pat. No. 4,918,690 as well as in other prior art systems generally employ a centralized management whereby each node operates in accordance with logic external to the nodes themselves.

The evolution of control networks of the kind described derives from the superimposition of data on a power signal in a manner such as is described in U.S. Pat. No. 5,148,144 (Sutterlin et al.) also assigned to Echelon Corporation. Such topologies are dictated by the topology of domestic and industrial wiring distribution systems which have, for the most part, employed radial or star topologies whereby each power outlet is connected in a radial fashion to a central distribution board. Thus, in such a system, if each cell is adapted for coupling to a respective power outlet, then it will necessarily form a non-distributed network having a star topology.

It will be apparent that prior art configurations suffer from several drawbacks. Generally, communication is effected between an output of one cell and a corresponding input of a plurality of cells connected thereto. This results in limited data transfer in the system. Furthermore, in the event of communications problems, such as noise coupled to a part of the network, it is more difficult to locate the source of the problem owing to the parallel connection of several cells and the noise causes degradation of the whole network.

Additionally, such configurations are power-limited because the available power is split at the junction between adjoining branches: each branch thus receiving only a fraction of the power provided by the power supply.

Finally, as noted above, addressing must be effected by means of a unique ID burnt into the cell during manufacture or manually during installation. This renders the network inflexible because the controller must be programmed so as to know in advance the location in the network of each cell. Therefore, if cells are interchanged, added or removed then the controller must be re-programmed accordingly: there being no provision in such topologies to allocate addresses "on the fly" during processing in real time.

SUMMARY OF THE INVENTION

It is therefore an object of the invention to provide a distributed topology wherein each cell can be controlled via control logic stored integrally therein instead of, or in addition to, an external control manager and which allows serial connection of cells so as thereby to reduce cabling.

These objectives are realized in accordance with a preferred embodiment of the invention by means of a network topology allowing distributed sensing, control and communication, comprising:

a power source, a plurality of line-Powered, Serially connected Intelligent Cells (PSICs) coupled to the power source and to each other via respective communication channels each allowing mutually independent communication and comprising at least two electrical conductors, addressing means for uniquely referencing each of said PSICs, and at least one payload element coupled to one of the PSICs for operating in accordance with control logic embedded in or fed to said one of the PSICs.

The use of such a topology allowing serial connection of the cells, also allows for data to be passed in either direction from one cell to an adjacent cell. Furthermore, communication between one pair of adjacent cells is independent of a simultaneous communication between another pair of adjacent cells. This, of course, is not possible with hitherto proposed systems employing a star or bus topology.

According to one embodiment of the invention, control data is superimposed on the power signal and is extracted within each cell from the power signal received from a preceding cell in the network and, likewise, is superimposed on the power signal fed to a succeeding cell in the network.

Alternatively, power can be fed discretely to all of the cells in the network in a bus-type of arrangement, only the data itself being fed serially in either or both directions from one cell to another.

BRIEF DESCRIPTION OF THE DRAWINGS

In order to understand the invention and to see how the same may be carried out in practice, some preferred embodiments will now be described, by way of non-limiting example only, with reference to the accompanying drawings, in which.

DETAILED DESCRIPTION OF PREFERRED EMBODIMENTS

Figure 1:
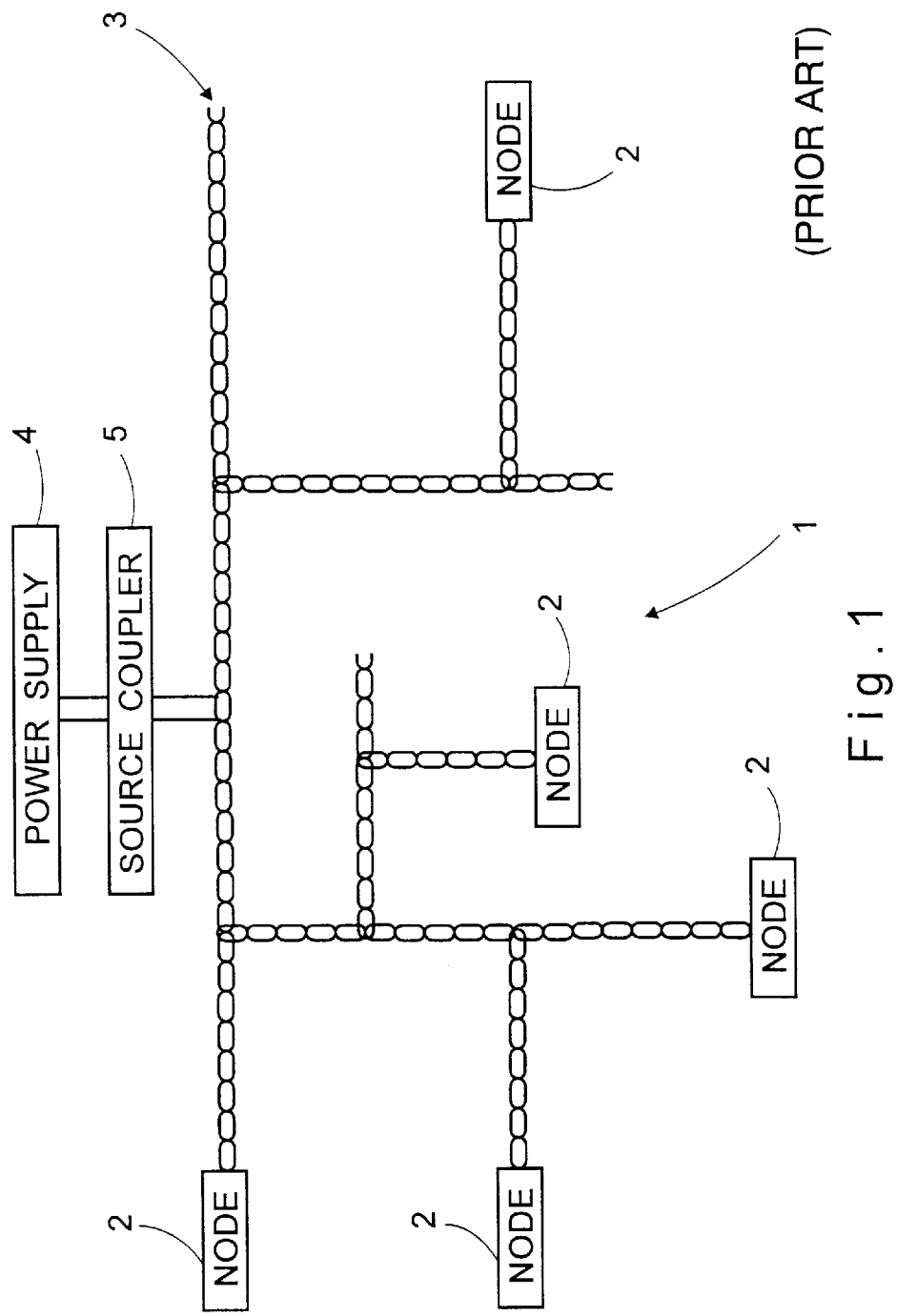
FIG. 1 shows schematically a typical prior art distributed network.
Figure 2:
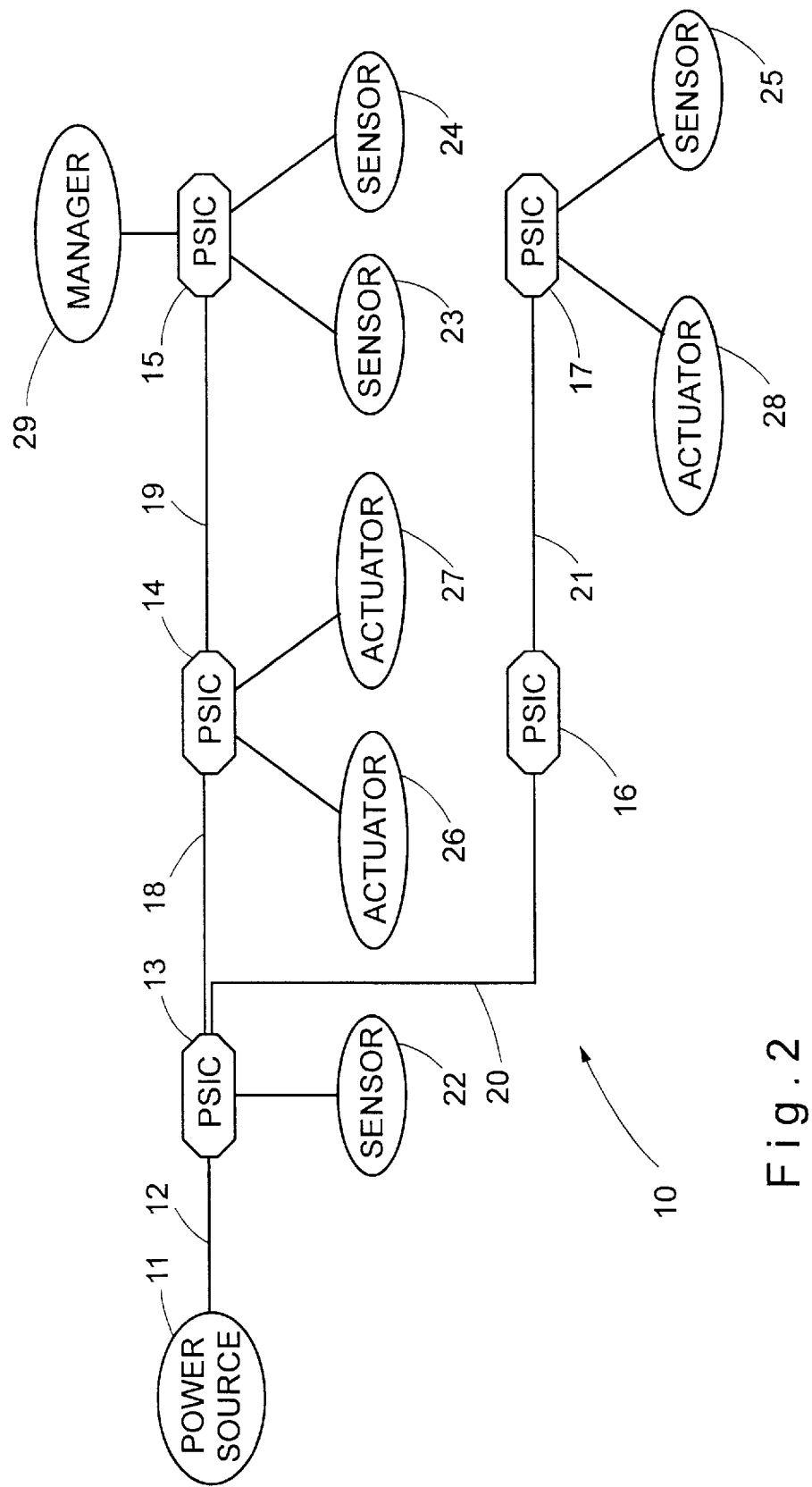
FIG. 2 shows schematically a distributed serial network according to the invention.

FIG. 2 shows a distributed intelligent network depicted generally as 10 comprising a power source 11 for feeding power via a twisted wire pair 12 to a line-Powered, Serially connected Intelligent Cell (PSIC) 13 which is in turn serially connected to other PSICs 14, 15, 16 and 17 via respective twisted wire pairs 18, 19, 20 and 21 (constituting respective bi-directional communication channels).

For the purpose of the following description, the PSICs 13, 14, 15, 16 and 17 will be referred to as first, second, third, fourth and fifth PSICs, respectively and, indeed, it is according to this order that the PSICs are individually addressed so that data which is serially transmitted in either direction along the bi-directional communication channels constituted by the twisted wire pairs will be correctly directed to or from the appropriate PSIC.

A sensor 22 is connected to an input of the first PSIC 13; a pair of sensors 23 and 24 are connected to respective inputs of the third PSIC 15 and a sensor 25 is also connected to one input of the fifth PSIC 17. Likewise, a pair of actuators 26 and 27 are connected to respective outputs of the second PSIC 14 and an actuator 28 is also connected to an output of the fifth PSIC 17. A Manager 29 is coupled to an input of the third PSIC 15 and constitutes an external logic control and monitoring element for feeding predetermined logic to the network in order to direct the PSICs how to route control data to other PSICs in the network and how to control any actuators coupled thereto and for monitoring the status of PSICs, actuators and sensors in the network.

Before describing the operation and addressing of the PSICs, several generic features thereof are to be noted with reference to FIG. 2. It is first of all to be noted that the PSICs 13 to 17 are not necessarily identical. For example, the first PSIC 13 has two outputs: one connected to an input of the second PSIC 14 and the other connected to an input of the fourth PSIC 16. On the other hand, all of the PSICs are indeed characterized by having a single power input only. Secondly, there may be connected to the PSIC optionally a sensor or an actuator or, indeed, nothing at all as is the case with the fourth PSIC 16. When no payload element is connected to a PSIC, that PSIC functions as a repeater for amplifying the power/data signal on the communication channel in order to compensate for attenuation of the signal over long communication lines. Such repeaters, which are commonly provided at intervals over long lengths of communication channels are known per se and are described, for example, in the above-referenced U.S. Pat. No. 5,454,008 to Baumann et al. the contents of which are incorporated herein by reference.

Thirdly, it is to be noted that an external logic control unit constituted by the Manager 29 may, optionally, be connected to one of the PSICs in the network 10. When so provided, the Manager 29 may supplement discrete logic stored in each of the PSICs or, if desired, may obviate the need for any internal logic to be provided within the PSICs. In a very simple system, for example, the sensor 22 may be a light dependent resistor and the actuator 28 might be an illumination lamp controlled by the PSIC 17 so as to control the brightness thereof as a function of the level of illumination falling on the sensor 22. In such case, the actuator 28 would be responsive to a control signal representative of the required illumination level and this signal would be generated by the fifth PSIC 17 either in accordance with local logic contained therein, or in accordance with logic transmitted through the network 10 from the Manager 29 or, indeed, in accordance with a combination thereof.

Whichever approach is employed, data representative of a sensor signal generated by the sensor 22 is fed by the first PSIC 13 to the Manager 29 via the second and third PSICs 14 and 15, respectively; and is fed, via the fourth PSIC 16 to the fifth PSIC 17. In such manner, both the Manager 29 and the fifth PSIC 17 having the actuator 28 connected thereto may respond to the illumination level on the sensor 22 so as to generate the correct control signal for controlling the actuator 28. If the fifth PSIC 17 is controlled by the Manager 29, then the control signal is fed serially along the twisted pair lines 19 and 18 to the first PSIC 13 from which it is then fed serially along the twisted pair lines 20 and 21 to the fifth PSIC 17. In either case, status data is fed by each of the PSICs in the network to the Manager 29 so as to allow the Manager 29 to monitor the status of all sensors and actuators in the network 10.

It is therefore to be noted that, in such a simple system, the actuator 28 is responsive to a sensor signal which may itself be generated remote from the actuator 28. On the other hand, if desired, the actuator may be responsive to a sensor connected to the same PSIC as the actuator. Indeed, multiple sensors and multiple actuators can be connected to the same PSIC providing, of course, that sufficient sensor and actuator interfaces are provided therein.

All of the PSICs in the network 10 except the first PSIC 13 as well as the third and fifth PSICs 15 and 17, respectively, (both of which are the last PSICs in their respective branches) receive both power and data from a preceding PSIC and also feed power and data to a succeeding PSIC. The third and fifth PSICs 15 and 17, respectively, may, of course, generally be provided with an interface to connect another PSIC thereto even though the interface is not actually used. However, the first PSIC 13 is different from the other PSICs in that it receives power from the power source 11 but does not receive data therefrom. Likewise, of course, it does not feed data received from succeeding PSICs to the power source 11. For this reason, the first PSIC 13 is not completely representative of the general PSIC architecture which is better described with reference to the second PSIC 14.

Figure 3:
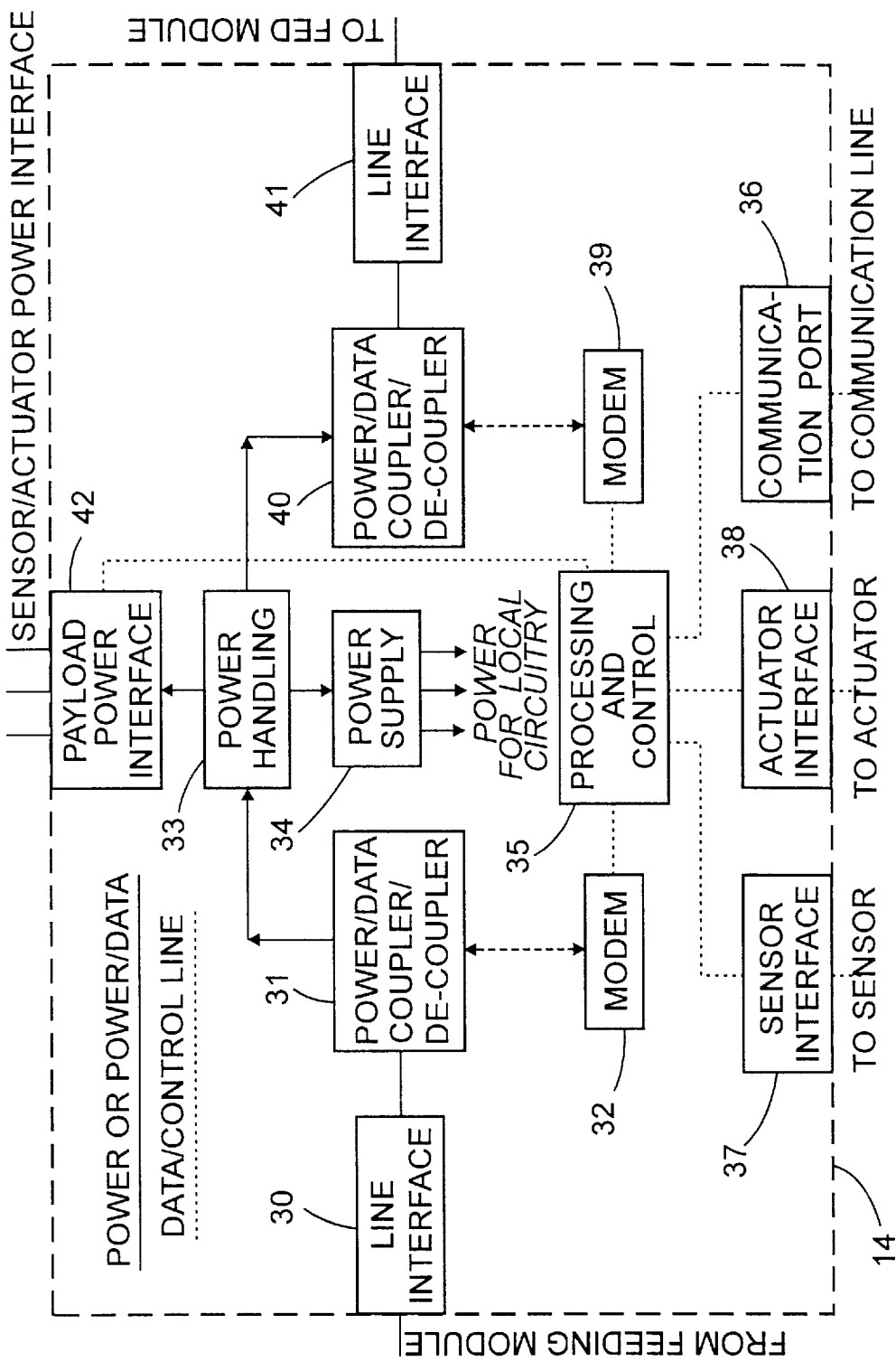
FIG. 3 is a block diagram showing functionally the principal components in a PSIC for use with the network illustrated in FIG. 1.

FIG. 3 is a block diagram showing the functional components which may be provided in the PSIC 14 in the case where power and data are transmitted together. The manner in which power and data may be delivered in a data communications network over the same cable bundle to a plurality of communications nodes therein is itself known and has long been used in telephony as described in the opening section of above-mentioned U.S. Pat. No. 5,148, 144 to Sutterlin et al. the contents of which are incorporated herein by reference.

The second PSIC 14 includes a line interface 30 constituting a first port for coupling to the first PSIC 13 so as to receive therefrom a first incoming power and data signal. The incoming combined signal is fed to a power/data coupler/de-coupler 31 which de-couples the first incoming data signal from the incoming power signal. The separated first data signal is fed to a modem 32 whilst the d.c. or a.c. power signal itself is fed to a power handling unit 33 for producing therefrom a first outgoing power signal for supplying power to a power supply 34 coupled thereto and which has several output channels, as required, for powering the local circuitry in the PSIC 14.

The first incoming data signal received by the modem 32 is analog and is converted to digital form for feeding to a processing and control unit 35 which processes the first incoming data signal according to control logic stored therein or, alternatively or additionally, in accordance with external logic fed by the Manager 29 to the processing and control unit 35 via a communication port 36 coupled thereto.

Likewise, the processing and control unit 35 may be responsive to various sensor signals each fed thereto via a respective sensor interface 37 and, as explained above, the processing and control unit 35 may be coupled to a plurality of actuator interfaces 38 each for coupling a respective actuator to the processing and control unit 35.

The processing and control unit 35 processes the first incoming data signal and produces a first outgoing data signal which is converted to an analog signal by a modem 39 and fed to a second power/data coupler/de-coupler 40 (constituting a second data coupling/de-coupling means) which receives the a.c. or d.c. power signal from the power handling unit 33 to which it is also coupled and combines the first outgoing data signal with the first outgoing power signal so as to generate a first outgoing power and data signal which is fed to a line interface 41. The line interface 41 constitutes a second port allowing the PSIC 14 to be connected to a corresponding successive PSIC. If desired, multiple PSICs can be coupled to the PSIC 14 via corresponding second ports each comprising a line interface 41 connected to a respective modem 39 and second power/data coupler/de-coupler 40.

In the above arrangement, each sensor interface 37 and actuator interface 38 constitutes a payload port for allowing a respective payload element to be connected to the processing and control unit 35.

It will be apparent that the various actuators connected to the processing and control unit 35 via their respective actuator interfaces 38 and, possibly, at least some of the sensors connected thereto via their respective sensor interfaces 37 will also need to be fed a power signal for their effective operation in addition to the data signal generated by the processing and control unit 35. To this end, there is also associated with each of the sensor interfaces 37 and the actuator interfaces 38 a corresponding payload power interface 42 which itself is coupled to the power handling unit 33 as well as being operatively coupled to the processing and control unit 35 for receiving a control signal therefrom and for sending a monitoring signal thereto. By such means, different voltage levels corresponding to the requirements of each sensor and actuator may correctly be provided to the corresponding interfaces in accordance with the control logic within the processing and control unit 35 or, indeed, externally applied thereto via the Manager 29 which itself is able to monitor their status.

In the foregoing description, the line interface 30 has been considered as the receiving interface to which the first incoming power and data signal is fed whilst the line interface 41 feeds the corresponding first outgoing power and data signal to successive PSICs connected thereto. However, as has been noted above, the communication channels in the network 10 are bi-directional and the PSIC 14 is thus equally well suited to receive a second incoming data signal from a successive PSIC. In this case, the power/data coupler/de-coupler 40 de-couples the second incoming data signal from the first outgoing power signal and the modem 39 converts the analog second incoming data signal to a digital equivalent for feeding to the processing and control unit 35. The modem 32 then reconverts the digital signal to an analog equivalent and the power/data coupler/de-coupler 31 superimposes the analog signal on the incoming power signal so as to feed the second outgoing data signal to the line interface 30.

It is thus to be noted that the first modem 32 allows for simultaneous, full duplex, handling of a first incoming data signal and a second outgoing data signal whilst, at the same time, the second modem 39 allows for simultaneous, full duplex, handling of a first outgoing data signal and a second incoming data signal. Thus, the PSIC 14 allows for four independent communications to be carried out simultaneously.

Whilst the invention is characterized by the serial connection of the PSICs so as to allow data to be fed from one PSIC to the next in either direction, it is not a requirement that the data be superimposed on the power signal. If desired, the power can be fed to each of the PSICs in the network via a common power bus or can be fed radially to each PSIC using a known star topology. In either case, the power/data coupler/decouplers 31 and 40 can then be dispensed with since the power and data signals are handled discretely. Indeed, even in the case where data and power are fed over the same twisted pair line, it will be noted that the first PSIC 13 receives only power from the power source 11 whilst data may be fed thereto only via the second PSIC 14. To this end, some of the internal architecture of the first PSIC 13 is different to that of the remaining PSICs as has been noted above. Specifically, the power/data coupler/decoupler 31 may be dispensed with since the power signal is fed directly to the power handling unit 33. For a similar reason, if desired, the power/data coupler/decoupler 40 in the last PSIC (i.e. the fifth PSIC 17 in the particular example shown in FIG. 2) may be dispensed with since no succeeding PSIC is connected thereto. On the other hand, if it were then required to extend the network, it would then be necessary to replace the simplified fifth PSIC 17 with one having a line interface 41 connected to a power/data coupler/decoupler 40.

Having described the internal architecture of the PSICs, the addressing thereof will now be described. The addressing permits a receiving PSIC to know to which succeeding PSIC to route data and also specifies from which sensor data was transmitted thereto. To this end, each data packet contains a header defining the source and destination addresses according to a predetermined protocol, as is known in the art.

Figure 4:
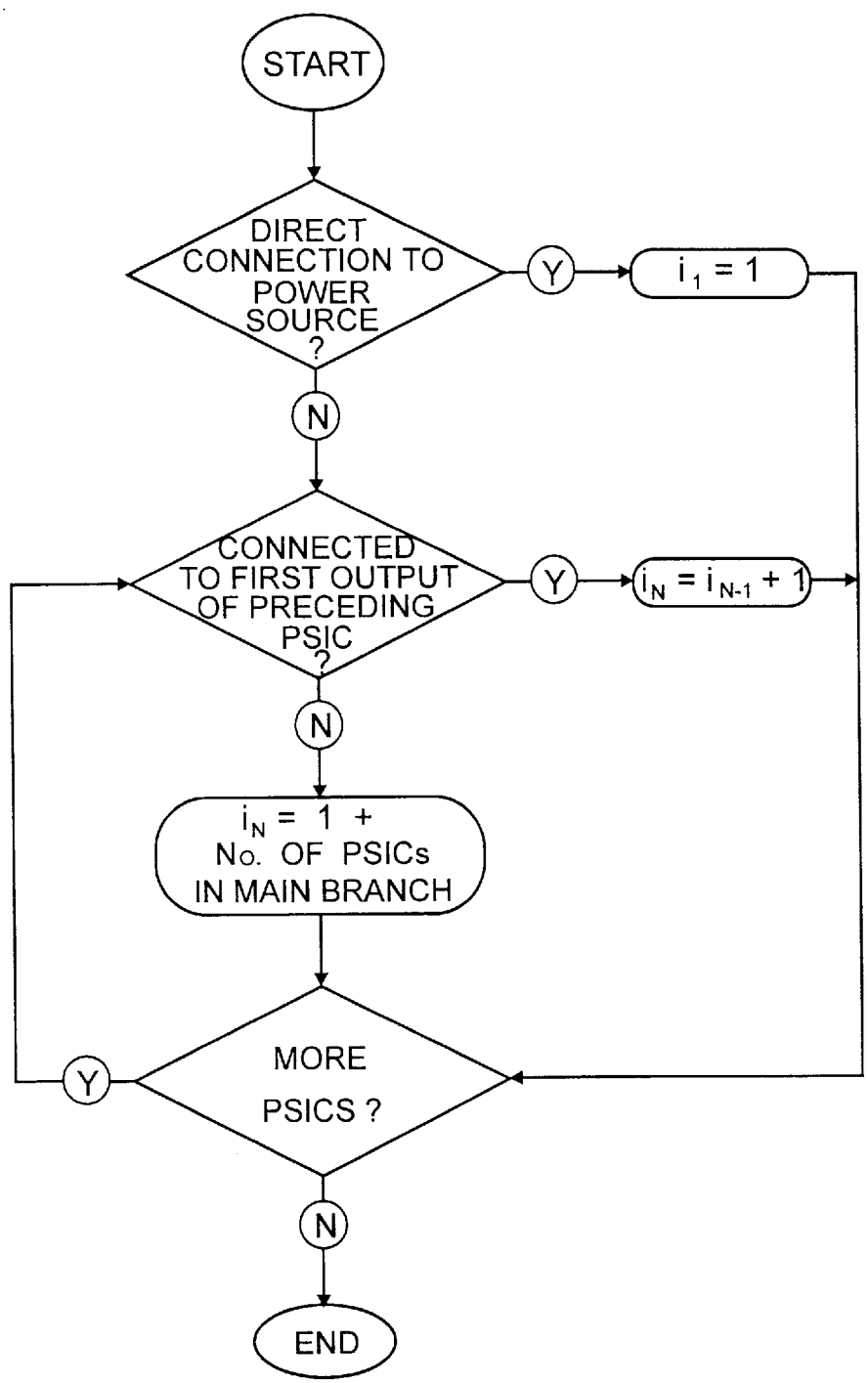
FIG. 4 is a flow diagram showing the principal operating steps for effecting addressing of each individual PSIC in such a network.

FIG. 4 is a flow diagram showing the principal steps associated with discretely and uniquely addressing each of the PSICs shown in the network 10 according to the topology of the network. The network topology dictates the number of PSICs in the main branch constituted by the first, second and third PSICs 13, 14 and 15 respectively. The first PSIC 13 "sees" that it is connected directly to the power source 11 and so assigns itself an internal address I=1. Subsequent PSICs operate according as to whether they are connected to the first output of the preceding PSIC or, in the simple case, where only two branches are provided, to the second output thereof. In this case, a PSIC which is connected to the first output of the preceding PSIC assigns itself an internal address $I_N$ equal to the index of the preceding PSIC+1, i.e. $I_{N-1}+1$.

On the other hand, if the current PSIC is not connected to the first output of the preceding PSIC, then assuming that there are only two branches as is the case in the network 10 shown in FIG. 2, the index $I_N$ of the current PSIC is set to one plus the number of PSICs in the main branch. Thus, in the network 10 wherein there are three PSICs (13, 14 and 15) in the main branch, the index of the fourth PSIC will be set to (1+3) i.e. 4.

It will be apparent that the logic shown in FIG. 4 is adapted to the particular network construction shown in FIG. 2 but is amenable to simple adaptation in the case where additional branches are provided. This process can be performed independently and automatically, e.g. on powering up the system.

The advantage of employing logic of the kind described above with respect to FIG. 4 is that PSICs can be added to, or removed from the second branch comprising the fourth and fifth PSICs 16 and 17 without requiring that the addressing logic be changed in any way. Indeed, in the simpler case where only a single branch is provided, employing addressing logic of the kind described easily allows PSICs to be added to, or removed, from the single branch thus rendering the network completely flexible.

Alternative methods of providing the addressing logic are to provide an encoder in each PSIC which may be manually set to a discrete address known also to the Manager 29, if provided. The encoder can be in the form of a DIP switch as is commonly used in network cards or can be in the form of a unique address code stored in ROM. If desired, a combination can be employed whereby some of the address codes are stored within the PSIC whilst other addresses are allocated "on the fly" based on the network topology according to the logic shown in FIG. 4. Such an arrangement is particularly suited where multiple branches are employed so that, for example, the first PSIC in each branch can be hardware programmed with specific addresses suitably offset to allow addition of further PSICs to the respective branches without conflicting with the respective addresses of the first PSICs in subsequent branches. For example, the first PSIC 13 in the first branch can be given an address of 1 in the normal manner whilst the first PSIC 16 in the second branch can be given an address equal to 100. This would allow up to 96 additional PSICs to be connected in the main branch without conflicting with the pre-set address of the first PSIC 16 in the second branch. Having done this, the addressing of each of the PSICs in each branch could then be determined in accordance with the network topology as described above with reference to FIG. 4.

In the case where an external control unit is provided in the form of the Manager 29, it is obviously necessary that the Manager 29 be pre-programmed so that it knows what action to take in respect of each of the PSICs and, to this end, is aware of the first PSIC in each branch. However, in those cases where the Manager 29 is dispensed with, it is only necessary that each PSIC knows its own address and that the data sent to each PSIC in order to operate one or more actuators connected thereto is suitably encoded with the correct PSIC address.

The connection of multiple sensors and actuators to the PSICs has been described with some generality representative of a typical network. However, it is to be understood that the invention contemplates modification without departing from the spirit of the invention. For example, in its simplest form the network may be provided with only a single payload element. This might be an actuator for responding to logic fed to a PSIC to which the actuator is connected or within which the logic is stored. Alternatively, the payload element may be a sensor for relaying a respective control signal to different PSICs in the network dependent on the sensor signal generated thereby. Such an arrangement might be of use, for example, for coupling the network to a remote system having actuators responsive to the control signals generated by the network. Also, the sensors may be any device which produces more than one fixed output signal according to a status of the sensor. Thus, for example, the sensor could optionally be a manual selector switch whose output is determined according to which switch position is selected.

It is also to be understood that the control signal produced by the processing and control unit may be wholly or partially constituted by data which is ultimately input to a database connected either directly or indirectly to the network.

It will also be appreciated that whilst the invention is particularly suited to bi-directional data communication, the network can be used to feed data in only one direction, if desired.

It is also to be noted that within the context of the invention and appended claims, the term "preceding" as applied to PSIC indicates a PSIC which is coupled to an adjacent PSIC and feeds power thereto. Likewise, the term "succeeding" as applied to PSIC indicates a PSIC which is coupled to an adjacent PSIC for receiving power therefrom.

The invention thus provides an intelligent, distributed network wherein a plurality of intelligent cells are serially connected via bi-directional communication channels permitting data (and optionally power) to be fed serially along the network from one PSIC to the other, in either direction.

I claim:

1. A network topology allowing distributed sensing, control and communication, comprising:
   a power source,
   a plurality of line-Powered, Serially connected Intelligent Cells (PSICs) coupled to the power source and to each other via respective communication channels each allowing mutually independent communication in either or both directions and comprising at least two electrical conductors,
   addressing means for uniquely referencing each of said PSICs, and
   at least one payload element coupled to one of the PSICs for operating in accordance with control logic embedded in or fed to said one of the PSICs.

2. The network topology according to claim 1, wherein the at least one payload element is a sensor for providing a sensor signal to which the control logic is responsive for routing control data to at least one other PSIC in the network.

3. The network topology according to claim 1, wherein the at least one payload element includes an actuator coupled to one of the PSICs for operating responsive to control data fed thereto.

4. The network topology according to claim 1, wherein the control logic is at least partially contained in a discrete management unit connected to one of the PSICs.

5. The network topology according to claim 1, wherein the control logic is wholly contained within the PSICs.

6. The network topology according to claim 1, wherein the addressing means are at least partially encoded within the PSICs.

7. The network topology according to claim 6, wherein the addressing means includes manually settable switches in the PSIC for setting a unique address code.

8. The network topology according to claim 1, wherein the addressing means is dictated by the network topology.

9. The network topology according to claim 1, wherein the addressing means is partially dictated by the network topology.

10. The network topology according to claim 8, wherein the PSIC which is nearest to the power source and which receives power directly therefrom is allocated a first address and successive PSICs are allocated successive addresses according to the order in which they are connected relative to the power source.

11. The network topology according to claim 1, wherein power and data are fed together on a common channel and at least one of the PSICs includes:
    a first port for coupling to the power source for receiving an incoming power signal,
    processing means for generating a control signal in accordance with a predetermined logic,
    at least one second port each for coupling to a respective successive PSIC, and
    a respective data coupling/decoupling means coupled to each of the second ports and to the processing means for receiving an incoming data signal as well as an outgoing power signal derived from the incoming power signal and for superimposing the data signal on the outgoing power signal so as to generate an outgoing power and data signal and for feeding said outgoing power and data signal to the respective second port, and for receiving from the respective second port said incoming data signal and for de-coupling the incoming data signal from the outgoing power signal.

12. The PSIC according to claim 11, further including:
    at least one payload port each for coupling to a respective actuator or sensor and being coupled to the processing means for receiving the control signal and feeding the control signal to the respective actuator or for receiving a sensor signal from the respective sensor.

13. The PSIC according to claim 11, further including a communication port coupled to the processing means for coupling to an external logic control element so as to feed said predetermined logic to the processing means.

14. The PSIC according to claim 11, further including a communication port coupled to the processing means for coupling to an external logic control element for monitoring a status of the processing means and a payload element coupled thereto.

15. The PSIC according to claim 11, further including a communication port coupled to the processing means for coupling to an external logic control element so as to feed said predetermined logic to the processing means and for monitoring a status of the processing means and a payload element coupled thereto.

16. The network topology according to claim 1, wherein power and data are fed together on a common channel and at least one of the PSICs includes:
    a first port for coupling to a preceding PSIC for receiving a first incoming power and data signal and for transmitting a second outgoing data signal,
    first data coupling/decoupling means coupled to the first port for de-coupling from the first incoming power and data signal a first incoming data signal and an incoming power signal and for superimposing a second outgoing data signal on the incoming power signal so as to produce a second outgoing power and data signal,
    at least one second port each for coupling to a respective successive PSIC,
    a respective second data coupling/decoupling means coupled to each of the second ports for receiving a first outgoing data signal as well as an outgoing power signal derived from the incoming power signal and for superimposing the first outgoing data signal on the outgoing power signal so as to generate a first outgoing power and data signal and for feeding said first outgoing power and data signal to the respective second port, and for receiving from the respective second port a second incoming data signal and for de-coupling the second incoming data signal from the outgoing power signal, and
    processing means coupled to the first and second data coupling/de-coupling means for receiving the first and second incoming data signals and for generating a control signal in accordance with a predetermined logic.

17. The PSIC according to claim 16, further including:
    at least one payload port each for coupling to a respective actuator or sensor and being coupled to the processing means for receiving the control signal and feeding the control signal to the respective actuator or for receiving a sensor signal from the respective sensor.

18. The PSIC according to claim 16, further including a communication port coupled to the processing means for coupling to an external logic control element so as to feed said predetermined logic to the processing means.

19. The PSIC according to claim 16, further including a communication port coupled to the processing means for coupling to an external logic control element for monitoring a status of the processing means and a payload element coupled thereto.

20. The PSIC according to claim 16, further including a communication port coupled to the processing means for coupling to an external logic control element so as to feed said predetermined logic to the processing means and for monitoring a status of the processing means and a payload element coupled thereto.

21. The network topology according to claim 1, wherein power and data are fed to the PSICs on different channels and at least one of the PSICs includes:
    a first port for coupling to a preceding PSIC for receiving therefrom a first incoming data signal and for transmitting thereto a second outgoing data signal,
    processing means coupled to the first port for receiving said first incoming data signal and for generating a control signal in accordance with a predetermined logic,
    at least one payload port each for coupling to a respective actuator or sensor and being coupled to the processing means for receiving the control signal and feeding the control signal to the respective actuator or for receiving a sensor signal from the respective sensor,
    at least one second port each for coupling to a respective successive PSIC, and a fourth port for coupling to a power source for supplying power to the processing means and to each of the sensors and/or actuators.

22. The PSIC according to claim 21, further including a communication port coupled to the processing means for coupling to an external logic control element so as to feed said predetermined logic to the processing means.

23. The PSIC according to claim 21, further including a communication port coupled to the processing means for coupling to an external logic control element for monitoring a status of the processing means and a payload element coupled thereto.

24. The PSIC according to claim 21, further including a communication port coupled to the processing means for coupling to an external logic control element so as to feed said predetermined logic to the processing means and for monitoring a status of the processing means and a payload element coupled thereto.

* * * * *